United States Patent [19]

Myers et al.

[11] Patent Number: 4,739,590

[45] Date of Patent: Apr. 26, 1988

[54] METHOD FOR SEAMING GLASS

[75] Inventors: Daniel O. Myers, Silver Lake; Mark E. Baskin, Hudson, both of Ohio

[73] Assignee: ACC Automation, Inc., Akron, Ohio

[21] Appl. No.: 3,413

[22] Filed: Jan. 15, 1987

Related U.S. Application Data

[62] Division of Ser. No. 743,430, Jun. 11, 1985, abandoned.

[51] Int. Cl.[4] .............................................. B24B 1/00
[52] U.S. Cl. .................... 51/283 E; 51/74 R
[58] Field of Search ............. 51/283 E, 80 A, 165.72, 51/74 R, 76 R

[56] References Cited

U.S. PATENT DOCUMENTS

| | | | |
|---|---|---|---|
| 2,966,013 | 12/1960 | Hanneken | 51/78 |
| 3,805,455 | 4/1974 | Aellig et al. | 51/76 R |
| 3,932,962 | 1/1976 | Devillers | 83/565 |
| 4,375,141 | 3/1983 | Gaetano | 51/3 |
| 4,519,167 | 5/1985 | Halberschmidt et al. | 51/165.77 |
| 4,528,780 | 7/1985 | Halberschmidt | 51/283 E |
| 4,559,684 | 12/1985 | Pryor | 29/156.4 |

FOREIGN PATENT DOCUMENTS 2723231 11/1978 Fed. Rep. of Germany.

*Primary Examiner*—Harold D. Whitehead
*Attorney, Agent, or Firm*—Renner, Kenner, Greive, Bobak & Taylor

[57] ABSTRACT

A system for performing operations on the edge of an irregularly shaped workpiece, such as seaming the edge of a piece of glass (G) is accomplished by moving the glass (G) along a conveyor (11, 12). The edge of the glass (G) is detected by a camera (13) which makes images of the glass (G). Electronic circuitry (20) receives the image information from camera (13) and determines the location of the edge of glass (G) at a plurality of locations and stores information which is indicative of the entire profile of the glass (G). Additional circuitry (32) receives signals proportional to the location of the seaming heads (16, 18) and compares these signals with the data stored in circuitry (20). When the glass (G) has moved downstream to the position to be seamed, the seaming heads (16, 18) are then moved to the position of the detected profile of glass (G) to perform the seaming operation.

14 Claims, 8 Drawing Sheets

METHOD FOR SEAMING GLASS

This application is a division of application Ser. No. 743,430 filed June 11, 1985 now U.S. Pat. No. 4,658,550 issued Apr. 21, 1987.

TECHNICAL FIELD

This invention relates to a method and apparatus for performing work operations on a workpiece having irregularly shaped peripheral contour. More particularly, this invention relates to a method and apparatus for seaming, that is, removing the stress edges from a piece of glass, which electronically detects and records the contour of the edge of the glass while continuously conveying the same to a downstream location where the edges of the glass are seamed according to the detected and recording information concerning its peripheral configuration.

BACKGROUND ART

During the cutting of glass to a particular configuration, for example, a windshield for a vehicle, numerous finite small edge fractures or leads, as they are known in the art, occur about the perimeter of the glass on the corner edges thereof. These leads offer potential breakage points when the glass undergoes further processing involving thermal and mechanical stress changes. Furthermore, the sharp edges represent a safety hazard during the manual handling of the glass pieces.

In most processes a small portion of the glass material at the upper and lower sharp corners around the perimeter of the glass is removed thus creating generally beveled edges. This procedure, known in the art as glass seaming, increases the fracture resistance of the glass and reduces injuries caused by handling.

Heretofore, the most common method of seaming a piece of glass was primarily manual in nature and oftentimes inaccurate, inefficient and dangerous. In the usual process, two driven, vertically oriented, abrasive grinding belts are positioned adjacent and angular to each other forming a V at their intersection. The edge of a piece of glass to be seamed is then manually held against the V by a workman who attempts to move the glass so that the entire periphery is seamed. Not only is the operator in constant contact with the glass representing an injury hazard, but also such a process has its inherent inaccuracies. First, the operator must assure that the glass is held tightly and perfectly horizontal at all times to create a uniform seam on both sides of the glass. Next, the force applied by the operator as he is holding the glass against the belt must be constant to assure a uniform seam depth. Moreover, when the periphery of the glass is of an irregular shape, such as a windshield, overwhelming operator concentration is required to assure that the seam is consistent around the entire periphery.

The only attempts at automating the seaming process have not been very successful or practical. In one attempt the profile of the glass to be seamed is programmed into a controller for a grinder so that as the glass would move down a conveyor it would stop and the programmed grinder would move around the periphery thereof. This process was not only slow but also required precise positioning and holding of the glass at all times and further required total and exact uniformity of profile from piece to piece. Additionally, the process resulted in extended down times due to lengthy set up procedures when the grinders had to be reprogrammed to seam pieces of a different profile.

Another attempt at automation involved the use of a mechanical sensor associated with the grinder to try to ascertain the position of the edge of the glass as it moved along a conveyor. This sensor, in the form of a reed or finger, would, in theory, ride along the edge of the glass and as the contour of the glass changed, it would mechanically change the position of the grinder accordingly. However, this device too required uniformity in glass configuration and positioning for if the glass were too much off line on the conveyor, the mechanical sensor would be inoperative, totally missing the edge of the glass. Furthermore, the reed fingers were quite susceptible to breakage and as such, the speed of the operation had to be kept quite low. By operating at such a low speed, the time delay between the location of the finger and the location of the grinder induced inaccuracies into the seaming process.

Thus, even with the attempts at automation, today the best method known for glass seaming is still the manual method even though it too is fraught with problems.

DISCLOSURE OF THE INVENTION

It is thus a primary object of the present invention to provide a method and for seaming glass or processing the edge of a similar workpiece.

It is another object of the present invention to provide a method and, as above, which will operate continuously on any configuration workpiece without the need to stop to perform the seaming or grinding operation or to stop if the configuration of the workpiece changes.

It is a further object of the present invention to provide a method and, as above, which can operate at high speeds and maintain a great degree of accuracy.

It is still another object of the present invention to provide a method and, as above, in which precise positioning of the workpiece preparatory to seaming or grinding the edges thereof is not mandatory.

It is yet another object of the present invention to provide a method and, as above, which can be operated efficiently, economically and safely without the need for operator handling of the glass or workpiece.

It is a still further object of the present invention to provide a method and, as above, which minimizes mechanical breakdowns by being electronically controlled.

These and other objects of the present invention, which will become apparent from the description to follow, are accomplished by the improvements hereinafter described and claimed.

In general, in the method and apparatus for seaming or grinding the peripheral edges of an irregularly shaped workpiece, a conveyor holds the workpiece thereon and moves it from an upstream position to a downstream position. While moving in the downstream direction the contour of the periphery of the workpiece is electronically detected and a signal proportional thereto is provided. This signal is received and electronically stored until the workpiece has moved a predetermined distance downstream to the location where it will be seamed. At that point the seaming device receives the signal indicative of the location of the periphery of the workpiece and performs its seaming operation in response thereto.

PREFERRED EMBODIMENT FOR CARRYING OUT THE INVENTION

Figure 1:
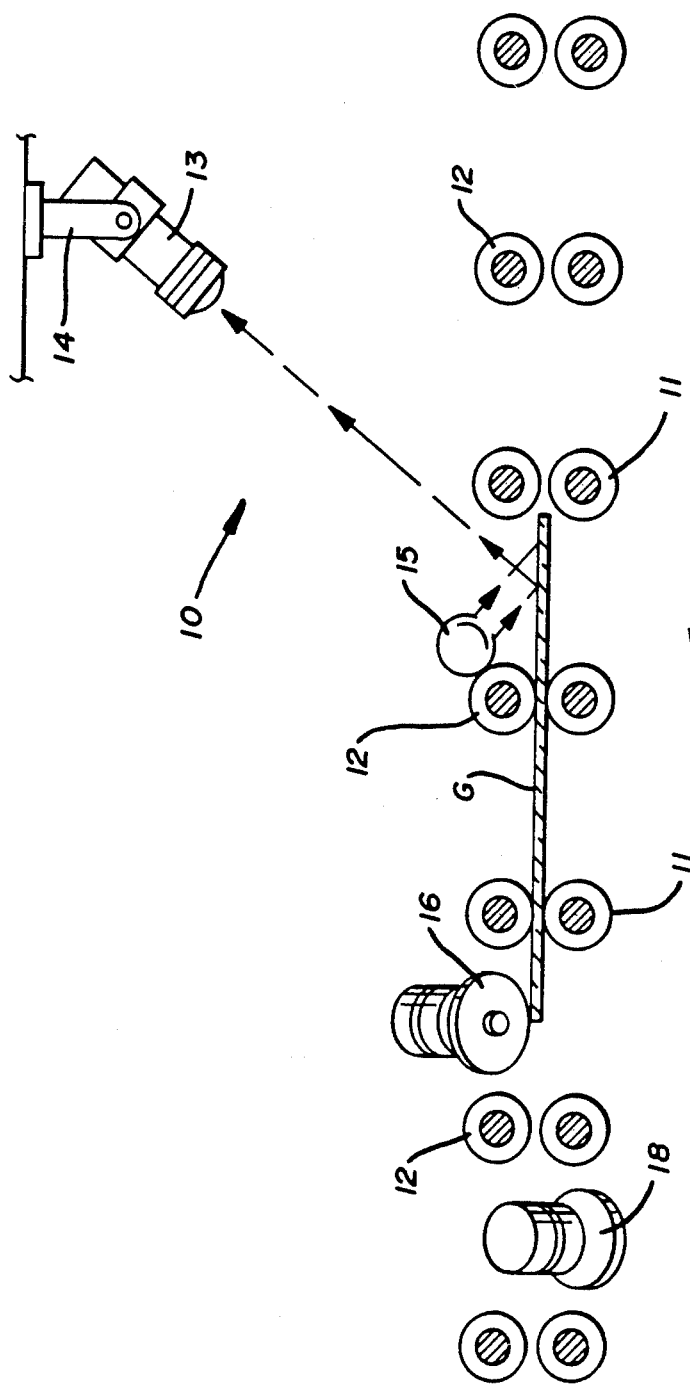
FIG. 1 a schematic side elevational view of a workpiece moving along a conveyor with its peripheral edge being scanned and ground.
Figure 2:
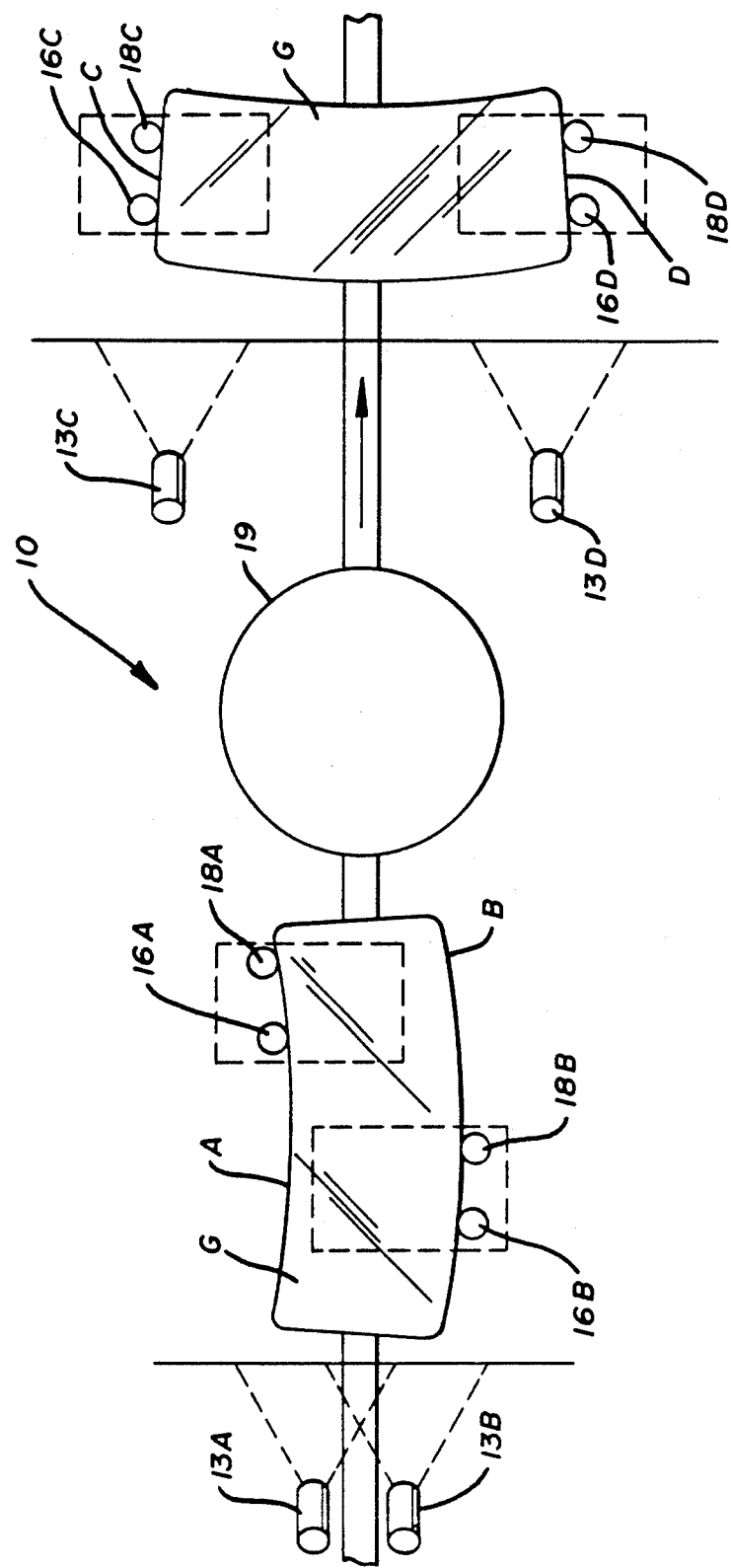
FIG. 2 is a schematic top plan view of the workpieces moving along the conveyor, showing two workpieces having their peripheral edges ground.

The apparatus for seaming or edge grinding a workpiece is generally indicated by the numeral 10 in FIGS. 1 and 2 to which reference is made for an overview of the present invention. An irregularly shaped workpiece, shown in the form of a piece of windshield glass G, but which could be of any material being processed, is continuously moved by a conveyor including lower drive rolls 11 and upper rolls 12. Lower rolls 11 are preferably of a hard material with upper rolls 12 being spaced therefrom and being made of a more flexible rubber material so that various thicknesses of glass may be accommodated and so that a uniform holding force is provided. As glass G is moved between rollers 11 and 12, to the left in FIG. 1, a slight squeezing pressure may therefore be maintained thereon by providing a gap between rollers 11 and 12 slightly less than the thickness of glass G thereby holding glass G tightly on the conveyor.

Apparatus 10 includes four individual glass processing quadrants each processing a portion of the periphery of glass G. A line scan camera 13 is provided for each quadrant. For example, as shown in FIG. 2, a line scan camera 13A is positioned to scan surface A of glass G; line scan camera 13B is positioned to scan surface B of glass G; line scan camera 13C is positioned to scan surface C of glass G; and line scan camera 13D is positioned to scan surface D of glass G. Cameras 13 are conventional items and can be Model CCD1500R industrial line scan cameras purchasable from Fairchild Camera and Instrument Corporation, Palo Alto, California.

As shown in FIG. 1, each camera 13 is mounted on a bracket 14 above the conveyor and positioned to receive the reflected light from a high frequency fluorescent lamp 15 which is illuminating the edge of glass G. Thus, cameras 13A, B, C and D continuously determine the position of the edge profiles A, B, C, D of glass G with respect to the conveyor center. As will be hereinafter described, what resides in the system memory is a digital representation of the edge position at any given point.

As shown in FIG. 1, the profile image detected by each camera 13 ultimately controls the positioning and operation of upper seaming heads 16 and lower seaming heads 18 which are positioned downstream from each camera 13 and which can consist of a grinding material such as industrial diamonds. It should also be appreciated that the image data obtained by cameras 13 could be utilized to control any type of equipment to perform various operations on the edge of a workpiece. When positioned as dictated by each camera 13, each upper head 16 removes glass from the upper edge of the piece and each lower head 18 removes glass from the lower edge of the piece. More particularly in reference to FIG. 2, camera 13A controls the position of upper head 16A and lower head 18A; camera 13B controls the position of upper head 16B and lower head 18B; camera 13C controls the position of upper head 16C and lower head 18C; and camera 13D controls the position of upper head 16D and lower head 18D. As will hereinafter be described in more detail, all of the seaming heads 16 and 18 are provided with two degrees of freedom. They may be moved inward and outward, laterally of the conveyor movement (X axis), and they may be angularly positioned so that they are always grinding normal to the corner edge of glass G.

As shown in FIG. 2, as glass G is moved from the upstream position of cameras 13A and 13B and then to seaming heads 16B, 18B, 16A, and 18A to process surfaces A and B, it must be rotated ninety degrees for further processing. To this end a rotation station 19 may be provided. At station 19, upper rolls 12 are temporarily discontinued and glass G may be raised, turned ninety degrees, and lowered to continue downstream so that edges C and D can be seamed.

Figure 3:
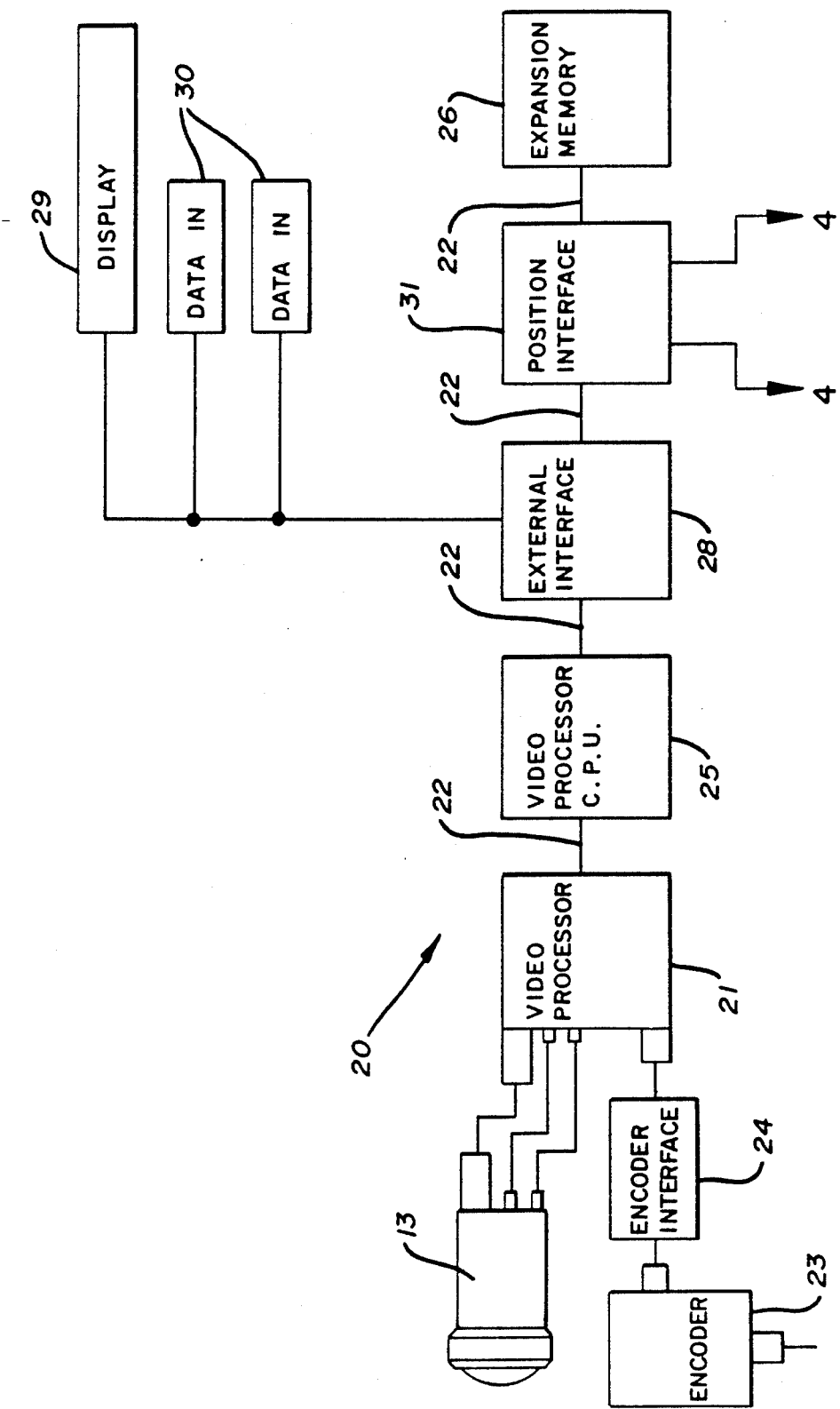
FIG. 3 is a block diagram of the video data acquisition circuit which receives and stores signals proportional to the profile of the workpiece.

A video data acquisition circuit is indicated generally by the numeral 20 in FIG. 3 to receive and process the signals from camera 13. While only one video data acquisition circuit 20 is shown, it should be appreciated that the total system would have four such circuits, one for each camera 13. Each camera 13 can be a 2048 bit line scan camera which therefore divides its field of view into 2048 points or pixels. As shown in FIG. 2, the field of view is established so as to partly cover a portion of glass G and partly cover an area to one side of glass G so that the edge of glass G to be scanned is generally located at or near the center of the field of view. As is well known in the art, line scan camera 13, when receiving light reflected from glass, will receive a bright image which will turn to a dark image where there is no glass. Thus, the point of transition from light to dark along the 2048 point scan, indicative of the location of the edge of glass G, will be detected by camera 13.

Figure 6:
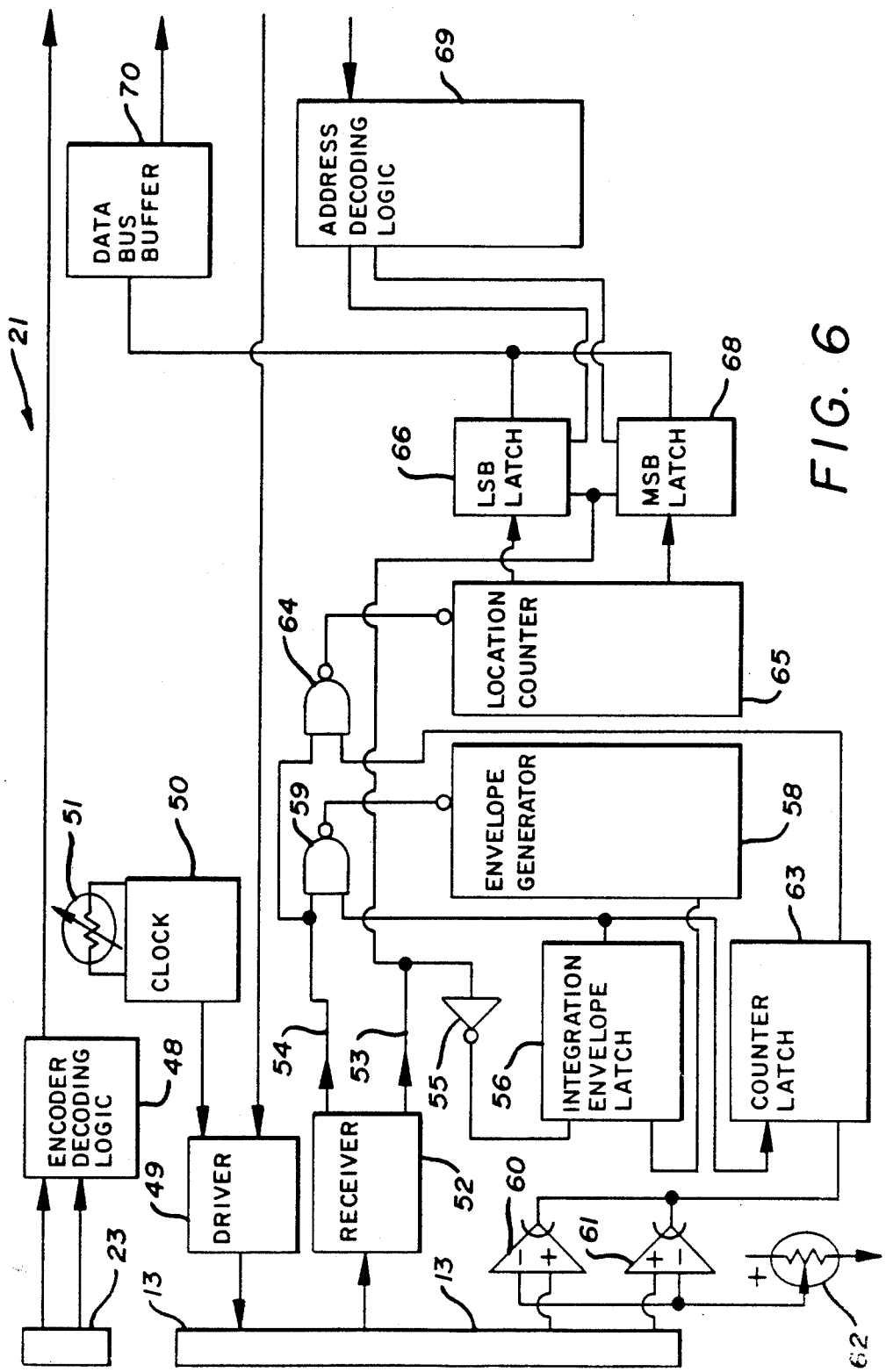
FIG. 6 is a block diagram of the video processor circuit shown in block form in FIG. 3.

A video processor circuit 21, the details of which are shown in FIG. 6 to be hereinafter described, can be a printed circuit card positioned on a parallel bus backplane 22. Video processor circuit 21 continually issues an exposure pulse to camera 13 which causes camera 13 to convert the light information to a digital representation of the profile. This digital information is then transferred to video processor circuit 21 in a serial format and the video processor 21 converts this serial information to a digital number representative of the location of the edge of the glass.

A conventional encoder 23 is associated with conveyor rollers 11 and 12 and, as is well known in the art, it monitors the movement of glass G and can be set to provide output pulses upon the movement of glass G a predetermined distance. In one application, for example, it has been found desirable to provide an encoder pulse for each 0.021 inch movement of glass G. These pulses are transmitted through a conventional encoder interface 24 for noise reduction and through video processor 21 to a video processor central processing unit (CPU) circuit 25.

Video processor CPU circuit 25 can be a conventional printed circuit card such as a Model ISB-3111 8085 Universal Central Processor Card purchasable from ISI International Corporation of Sunnyvale, California and is connected to parallel bus backplane 22. Upon the receipt of each pulse from encoder 23, video processor CPU 25 requests video processor circuit 21 to transfer one of the digital numbers representative of the location of the edge of glass G at the time of the encoder pulse. The video processor CPU 25 then transmits this information to an expansion memory circuit 26 where it is stored. Memory circuit 26 can be a Model STD-127 32k/64k ROM/RAM Memory Card manufactured by Micro-Link Corporation, Carmel, Indiana, and connected to parallel bus backplane 22. Each time video processor CPU 25 puts information in expansion memory 26, the memory address pointer is incremented so that eventually data for the entire profile of the edge of glass G being monitored by camera 13, for every 0.021 inch, for example, is stored. This data represents the position of the edge of the glass relative to the center of the conveyor in what can be called the "X-axis" direction, that is, the direction lateral to the movement of glass G.

At the same time video processor CPU 25 is looking at every tenth lateral position number stored in memory 26 and calculating the slope of a line between these positions, which positions, in the example given above, would be 0.21 inches apart. From this calculated slope the video processor CPU 25 utilizes its look up table which has stored therein numbers corresponding to $\tan^{-1}$ which then yields angle data for each tenth position. This angle data is stored in memory 26 in a parallel format with the lateral position data and is utilized, as will hereinafter be described, to rotate heads 16 and 18 so that a single point contact is maintained between the heads and the glass as the heads move around a curved portion of the glass, for example, at the corners.

The video data acquisition circuit 20 is also provided with a conventional external interface circuit 28, which can be a Model No. STD-134 64 Channel TTL I/O Card manufactured by Micro-Link Corporation, Carmel, Indiana, which is connected to parallel bus backplane 22 and which interfaces external control devices such as data displays 29, data entrance thumbwheels 30 and the like. Thus, at any point in time certain data, such as seam depth commands and the like, can be entered into the system through thumbwheels 30 and similarly data displayed on displays 29. It should also be appreciated that external interface circuit 28 could be utilized to accept input commands which would, for example, limit seaming only to the upper edge or lower edge, as may be desired in some instances.

Figure 4:
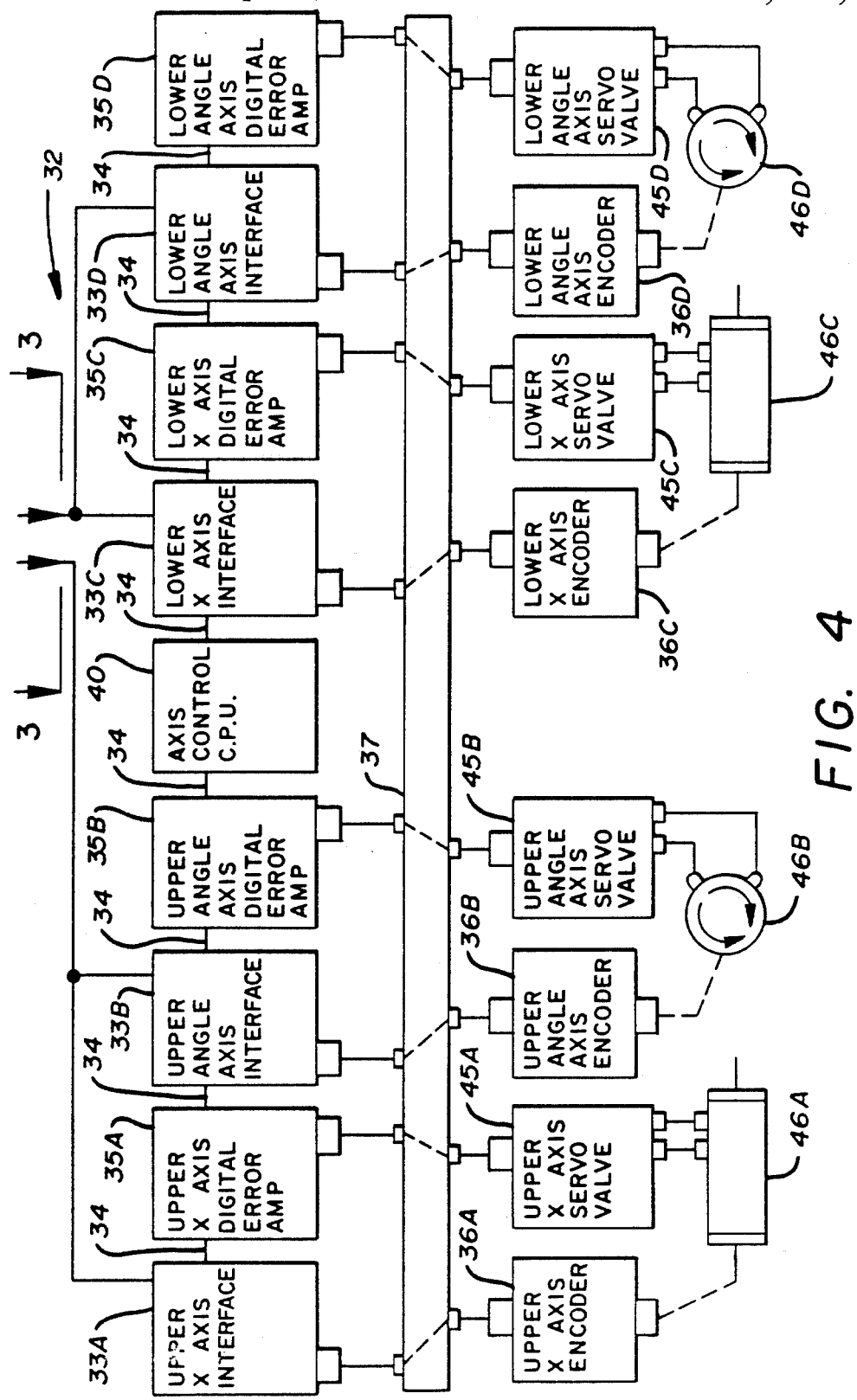
FIG. 4 is a block diagram of the position processing circuit which receives the signals from the data acquisition circuit and provides output signals to the grinders to position the same to seam the workpiece.

Video data acquisition circuit 20 also includes a conventional position interface circuit 31 which can be a card identical to external interface 28 which is connected to parallel bus backplane 22 and which interfaces the signal from circuit 20 to an axis positioning processing circuit, indicated generally by the numeral 32 and shown in detail in FIG. 4. Interface circuit 31 thus provides for the transfer of position command signals to circuit 32.

Figure 5:
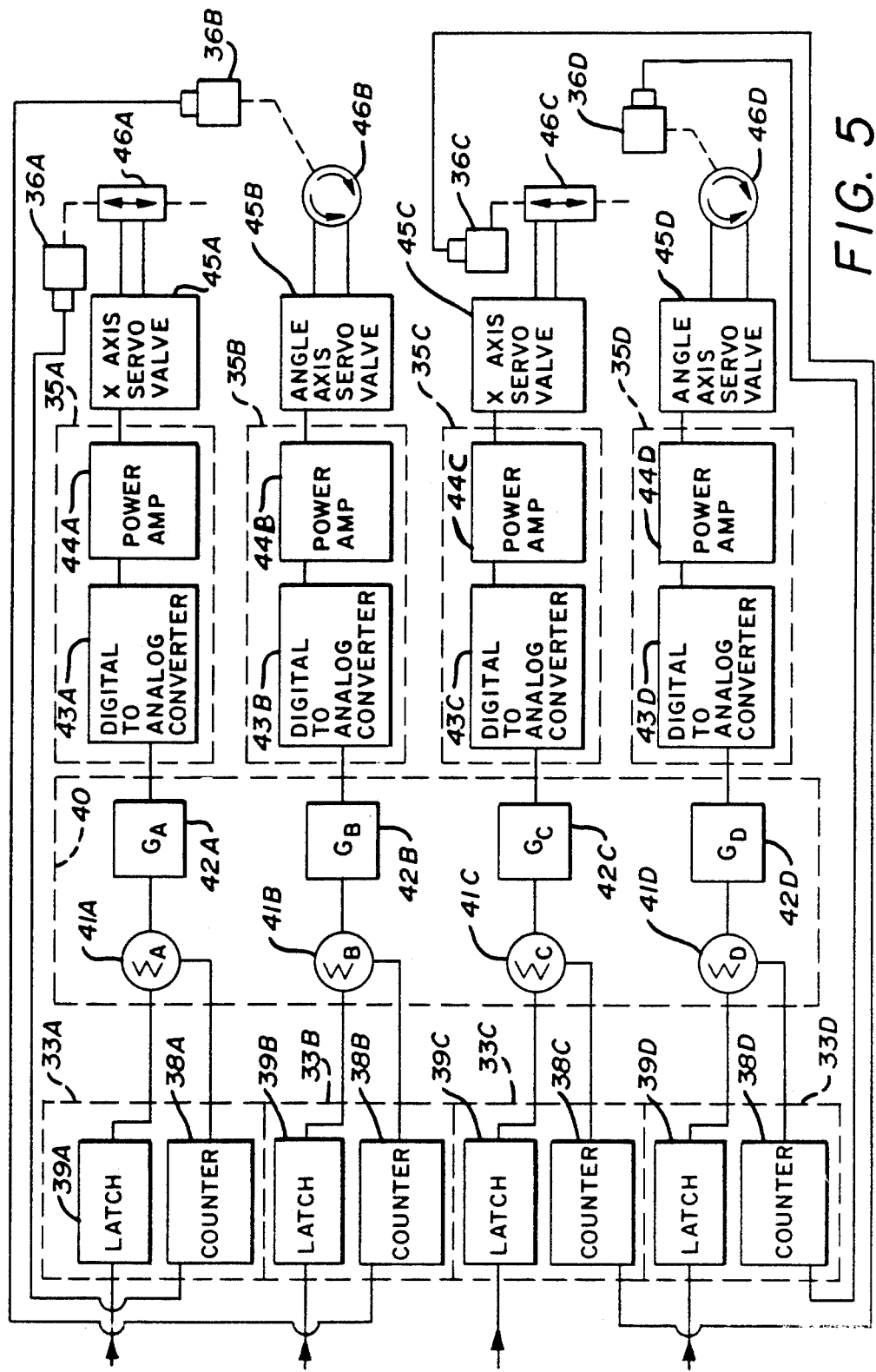
FIG. 5 is a block diagram of a servo control circuit utilized according to the present invention.
Figure 7:
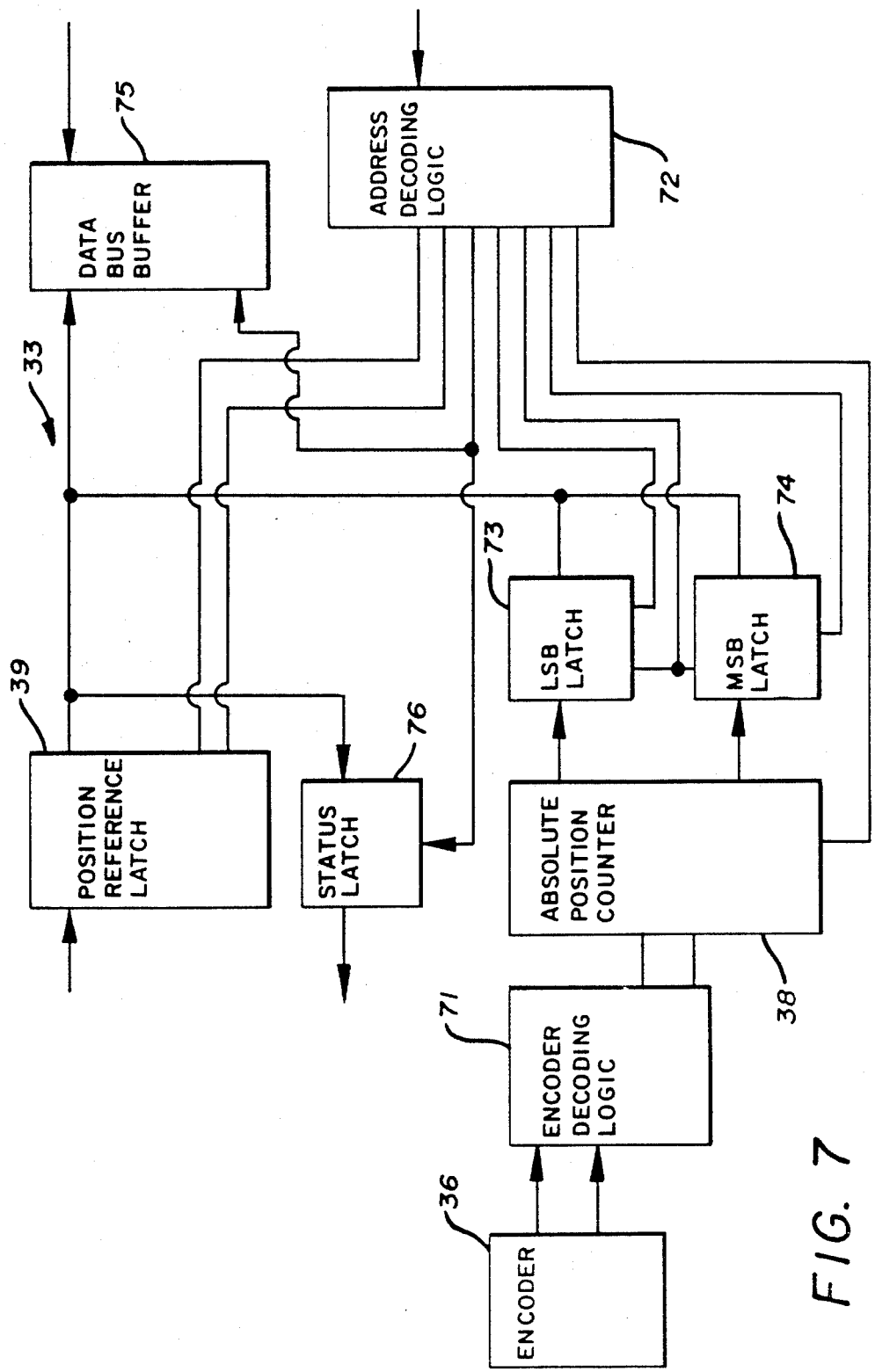
FIG. 7 is a block diagram of the interface circuits shown in block form in FIG. 4.

Like video data acquistion circuit 20, it should be appreciated that there are four identical axis positioning processing circuits 32, one for each camera 13. As shown in FIG. 4, each axis positioning processing circuit 32 includes four identical interface circuits 33, the details of which are shown in FIGS. 5 and 7 to be hereinafter described. Interface circuit 33A controls the upper seaming head X-axis interface functions, circuit 33B controls the upper seaming head angle axis interface functions, circuit 33C controls the lower seaming head X-axis interface functions, and circuit 33D controls the lower seaming head angle axis interface functions. All interface circuits 33 are connected to a parallel bus backplane 34.

Figure 8:
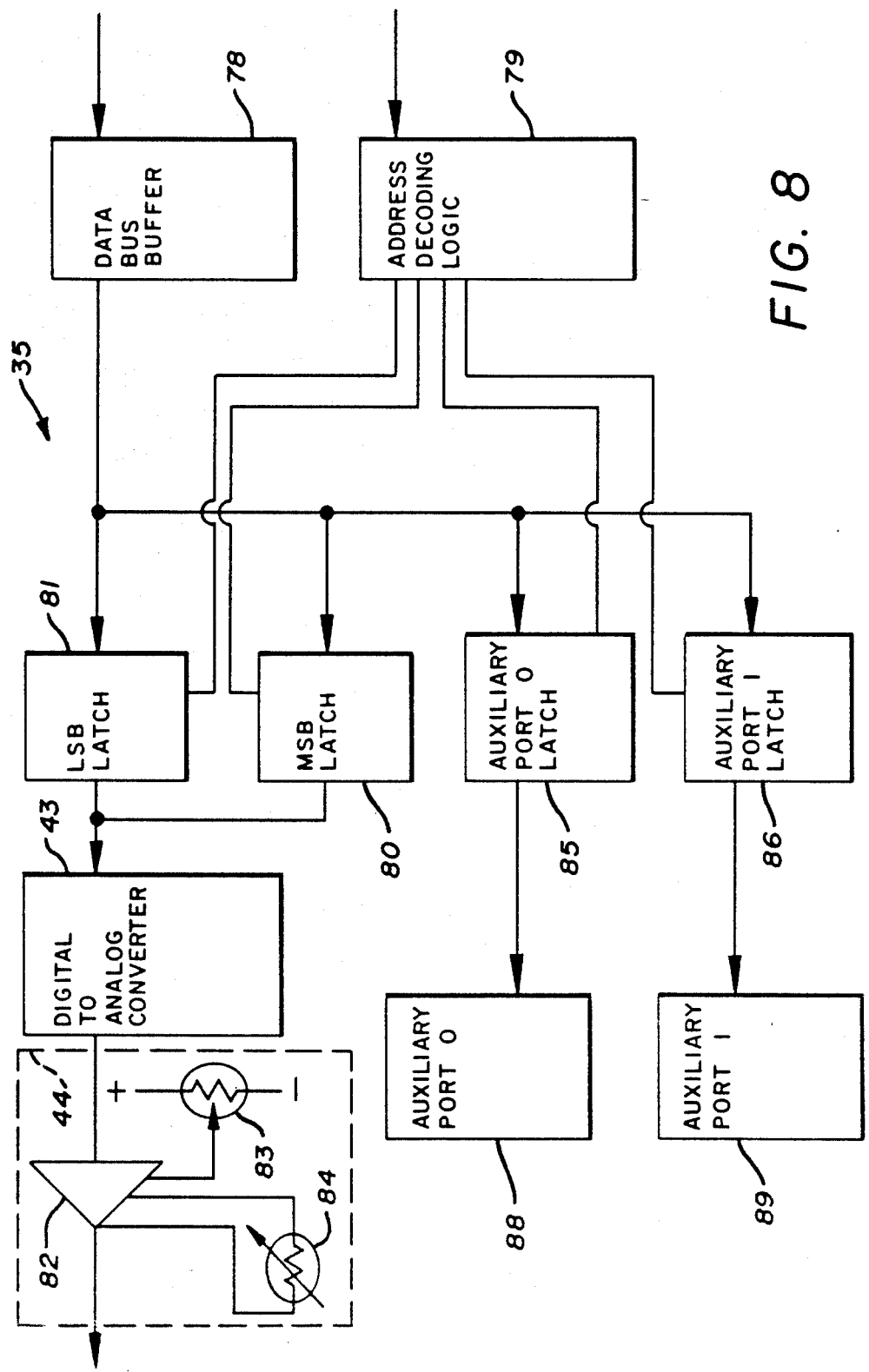
FIG. 8 is a block diagram of the digital error amplifier circuits shown in block form in FIG. 4.

Similarly, each axis positioning processing circuit 32 includes four identical digital error amplifier circuits 35, the details of which are shown in FIGS. 5 and 8 to be hereinafter described. Digital error amplifier circuit 35A is associated with the upper seaming head X-axis operations, circuit 35B is associated with the upper seaming head angle axis operations, circuit 35C is associated with the lower seaming head X-axis operations, and circuit 35D is associated with the lower seaming head angle axis operations. All digital error amplifier circuits 35 are connected to parallel bus backplane 34.

Each axis positioning processing circuit 32 also includes four encoders 36 which monitor the position of the seaming heads. Upper X-axis encoder 36A thus monitors the lateral position of an upper head 16, upper angle axis encoder 36B monitors the angular position of an upper head 16, lower X-axis encoder 36C monitors the lateral position of a lower head 18, and lower angle axis encoder 36D monitors the angular position of a lower head 18. Pulses indicative of the lateral or angular movement of the heads is fed from encoders 36A, B, C, and D through a conventional encoder interface circuit 37 for noise reduction to counters 38A, B, C and D (FIG. 5) of interface circuits 33. At the same time video processor CPU 25 is counting the pulses from encoder 23 as glass G moves from a predetermined point of scan by cameras 13 to a predetermined point of seam by heads 16 and 18. The known distance between the scan point and the seam point is programmed into video processor CPU 25 and when glass G has reached the point to be seamed, video processor CPU 25 pulls the position data out of memory 26, which data is sequentially sent through position interface 31 to latches 39A, B, C and D (FIG. 5) of interface circuits 33. Thus, the lateral and angular position where heads 16 and 18 should be for operation, are latched into interface circuits 33.

An axis control CPU circuit 40 of axis positioning circuit 32, which can be another card identical to video processor CPU 25, is connected to parallel bus backplane 34 and is continually comparing the current position of the heads from information in counters 38 with where the heads should be located from information in latches 39. Axis control CPU 40 then calculates the difference between these locations for all heads, indicated schematically as summing junctions 41A, B, C and D in FIG. 5, multiplies that difference by gain factor, indicated schematically as a gain blocks 42A, B, C and D in FIG. 5, and sends signals to digital error amplifier circuits 35.

Each digital error amplifier circuit 35A, B, C and D includes digital to analog converters 43A, B, C and D which convert the signal from axis control CPU 40 to a proportional current signal which is then amplified by power amplifiers 44A, B, C and D. The amplified current signals shift servo valves 45A, B, C and D which can be Series SM415 servo valves purchasable from Vickers, Incorporated of Troy, Michigan. Servo valve 45A activates hydraulic linear actuator 46A to move its upper head 16 laterally to a position at the detected edge of glass G. Servo valve 45B at the same time activates hydraulic rotary actuator 46B to rotate that upper head 16 to a detected position to be normal to the upper corner of the edge of glass G. Servo valve 45C activates hydraulic linear actuator 46C to move its lower head 18 laterally to a position at the detected edge of glass G. Servo valve 45D at the same time activates hydraulic rotary actuator 46D to rotate that lower head 18 to a detected position to be normal to the lower corner of the edge of glass G.

From the foregoing, the manner in which the seaming apparatus 10 is able to continually and accurately seam glass G should be understood. Reference is now made to FIGS. 6, 7 and 8 where more of the refined details of video processor circuit 21, interface circuits 33, and the digital error amplifier circuits 35 will now be described.

The details of each video processor circuit 21 are shown in FIG. 6. As previously described, one of the functions of circuit 21 is to receive pulses from encoder 23 and transmit the same to video processor CPU 25. This is accomplished through an encoder decoding logic circuit 48 which first determines the direction of the movement of glass G as sensed by encoder 23. While it is intended that the conveyor would only and always move in the downstream direction, it could happen from time to time that due to some mechanical momentary malfunction the conveyor could hesitate or even move slightly upstream and logic circuit 48 will detect and account for that movement. Logic circuit 48 then converts the signal from encoder 23 to a nonmaskable interrupt signal to video processor CPU 25, that is, a signal which cannot be ignored by video processor CPU 25. As previously described, at that time video processor CPU 25 then demands that video processor circuit 21 transfer digital information relating to the position of the edge of glass G.

A two channel differential driver circuit 49 of video processor circuit 21 receives a four megahertz signal and also receives a clock signal from exposure clock 50. A potentiometer 51 associated with clock 50 enables the exposure signal rate to be set as desired. A typical setting would have clock 50 generating pulses every 1.5 millisecond to camera 13 through driver 49, the purpose of which is to reduce noise factors for transmission purposes. Upon receipt of the signal from clock 50, camera 13 provides two signals through differential line receiver circuit 52, also provided for noise reduction. The signal on line 53 is the 1.5 millisecond clock 50 pulse and the signal on line 54 is the much faster four megahertz signal.

The 1.5 millisecond exposure clock 50 pulse is received on line 53 from receiver circuit 52 by an inverter 55 which sets an integration envelope latch 56. A signal from integration envelope latch 56 is provided to an envelope generator circuit 58 and a NAND gate 59 which is also receiving the four megahertz pulse on line 54. This enables envelope generator 58 to start counting down at the four megahertz rate. Envelope generator 58 is provided to guard against viewing unneeded cells which may exist in the particular camera 13 chosen for this system. Thus, a 2048 pixel window is provided.

At the same time, camera 13 is providing image data to two wire-ored binary video comparitors 60 and 61 whose threshold point can be established by potentiometer 62. Because of the nature of the particular line scan camera 13 selected, the 2048 images or pixels for each camera scan are kept on even and odd channels within camera 13 and thus the even images are sent at the four megahertz rate to one comparator, for example comparator 60, and the odd images to comparator 61. As previously described, these odd/even images are presented as digital information representing either a detected dark area (no glass) or a detected light area (glass). The transition point between the dark and light areas represents the edge of the glass and it is this transition point which is detected by comparators 60 and 61.

Because comparators 60 and 61 are wired-ored, upon the first image, odd or even, which is at the transition or threshold point, comparator 60 or 61 will provide a signal to a counter latch circuit 63, setting the same. Latch circuit 63 then provides a signal to a NAND gate 64 which is also receiving the four megahertz signal from receiver circuit 52 on line 54. Once both the signal from latch 63 and the four megahertz signal are received by NAND gate 64, a location counter 65 is pulsed at the four megahertz rate. Location counter 65 is thus counting the number of pixels in the image after the edge of the glass has been detected at the same speed that envelope generator 58 has been counting to zero.

When envelope generator 58 counts down to zero, indicative of the end of the window of pixels to be viewed, integration envelope latch 56 is reset which disables envelope generator 58 and also resets counter latch 63 which stops pulses being counted by location counter 65. The number now in counter 65, between 0 and 2048, is indicative of the position of the edge of glass G. At that time, upon the issuance of the next exposure pulse on line 53 from receiver 52, the data in location counter 65 is transferred to a least significant bit (LSB) latch 66 and a most significant bit (MSB) latch 68. Of course, that pulse on line 53 is also sent to inverter 55 which starts the whole process over such that information is now being obtained by video processor circuit 21 for the next scan location, 0.021 inches from the first.

As previously described, upon the receipt of each pulse from encoder 23, video processor CPU 25 requires that video processor circuit 21 transfers the location information to video processor CPU 25 and then that information is transferred to memory 26. This is accomplished through an address decoding logic circuit 69 and data bus buffer circuit 70. Thus, the command signal from video processor CPU 25 is received by address decoding logic 69 and LSB latch 66 gives up its data, through data bus buffer 70, which puts the information stored therein on parallel bus backplane 22. Then MSB latch 68 gives up its data, through data bus buffer 70, which puts the information stored therein on parallel bus backplane 22. The entire process is repeated until the data for all locations is stored in memory 26 as previously described.

The details of each of the interface circuits 33, of which there are sixteen in total number, four for each axis positioning processing circuit 32, of which there is one for each of the four cameras 13, are shown in FIG. 7. As previously described, absolute position counter 38 receives pulses from encoder 36 indicative of the actual position of seaming heads 16 or 18. These pulses from encoder 36 are transferred to counter 38 through an encoder decoding logic circuit 71 which decodes the direction of movement of heads 16 or 18 to pulse counter 38 upwardly or downwardly. As also previously described, on each pulse of encoder 23, data is dumped from memory 26 through position interface circuit 31 to position reference latch 39. This data, as just described, is representative of the location of the edge of glass G.

Axis control CPU 40 then, through an address decoding logic circuit 72, asks for the least significant bit and most significant bit information from position reference latch 39. At the same time, through address decoding logic 72, axis control CPU 40 sequentially takes information from absolute position counter 38 and dumps that information into a least significant bit (LSB) latch 73 and most significant bit (MSB) latch 74. At the request of axis control CPU 40, the information in latches 39, 73 and 74 is then transmitted through a data bus buffer circuit 75 to parallel bus backplane 34 to be picked up by axis control CPU 40 as previously described with reference to FIG. 5. A status latch 76 is provided merely to allow video processor CPU 25 to determine the status of axis control CPU 40, if desired.

The details of each of the digital error amplifier circuits 35, of which there are sixteen in total number, four for each axis positioning processing circuit 32, of which there is one for each of the four cameras 13, are shown in FIG. 8. As previously described, axis control CPU 40 receives the signals from interface circuits 33 indicative of the current position of heads 16 and 18 and the desired position of heads 16 and 18, determines the difference between the signals and provides this information through parallel bus backplane 34 to a data bus buffer circuit 78 of error amplifier circuit 35. Additionally, an address decoding logic circuit 79 decodes various commands of axis control CPU 40 placed on parallel bus backplane 34. A most significant bit (MSB) latch 80 and least significant bit (LSB) latch 81 are commanded by address decoding logic 79 to receive the error information through buffer 78. This information is transmitted to digital to analog converter 43, and the current output of converter 43 is amplified by power amplifier 44. Each power amplifier includes a conventional amplifier 82 with a gain potentiometer 83 and offset potentiometer 84. As previously described, this amplified error current signal is then utilized to operate servo valves 45.

As also shown in FIG. 8, digital error amplifier circuits 35 can also be provided with an auxiliary port 0 latch 85 and an auxiliary port 1 latch 86 which through an auxiliary port 0 88 and auxiliary port 1 89, respectively, can, at the command of axis control CPU 40 through address decoding logic 79, communicate with external devices. For example, various information can be transferred to digital readout devices if desired.

Having now described the seaming control apparatus 10 in detail, it should now be evident to one of ordinary skill in the art, that by constructing a device according to the concept of the present invention, an accurate, high speed and safe glass seaming operation or, for that matter, any type of finishing operation on any irregularly shaped workpiece, can be accomplished thus substantially improving the art and otherwise accomplishing the objects of the present invention.

I claim:

1. A method of performing a seaming or like operation on the peripheral edges of an irregularly shaped workpiece comprising the steps of continuously moving the workpiece longitudinally from an upstream unseamed position to a downstream seamed position, detecting the contour of the periphery of the workpiece laterally of the direction of movement of the workpiece while the workpiece is moving longitudinally in the downstream direction, recording the detected contour of the periphery of the workpiece, and seaming the periphery of the workpiece according to the detected and recorded contour at a position downstream of the area of detecting and while the workpiece continues to move longitudinally in a downstream direction.

2. A method according to claim 1 wherein the step of detecting includes the step of first detecting a portion of the periphery of the workpiece and the step of seaming includes the step of first seaming the first detected portion of the periphery of the workpiece.

3. A method according to claim 2 further comprising the step of rotating the workpiece approximately 90° after performing the step of first seaming the first detected portion of the periphery of the workpiece.

4. A method according to claim 3 wherein the step of detecting further includes the step of detecting the remaining portion of the periphery of the workpiece after rotating the same and the step of seaming further includes the step of seaming the remaining detected portion of the periphery of the workpiece.

5. A method according to claim 1 wherein the step of seaming is accomplished by seaming heads and includes the step of moving the seaming heads laterally according to the recorded information pertaining to the lateral edge of the workpiece.

6. A method according to claim 1 wherein the step of recording the detected contour includes the step of recording information pertaining to the rate of change of the contour of the workpiece.

7. A method according to claim 6 wherein the step of seaming is accomplished by seaming heads and includes the step of rotating the seaming heads according to the recorded information pertaining to the rate of change of the contour of the workpiece whereby the seaming heads grind normal to the edges of the irregularly shaped workpiece.

8. A method according to claim 1 further comprising the step of monitoring the position of the workpiece.

9. A method according to claim 8 wherein the step of detecting is accomplished by making a plurality of images longitudinally along the workpiece according to the monitored position thereof; said images being divided into a plurality of laterally spaced pixels.

10. A method according to claim 9 wherein the step of detecting includes the step of determining which pixel represents the edge of the workpiece.

11. A method according to claim 10 wherein the step of detecting further includes the step of counting the remaining pixels of the image after the pixel representing the edge of the workpiece is detected.

12. A method according to claim 1 wherein the step of seaming is accomplished by seaming heads and further comprising the step of monitoring the position of the seaming heads.

13. A method according to claim 12 further comprising the step of determining the difference between the monitored position of the seaming heads and the recorded contour of the periphery of the workpiece.

14. A method according to claim 13 wherein the step of seaming includes the step of moving the seaming heads pursuant to the determined difference between the mohitored position of the seaming heads and the recorded contour of the periphery of the workpiece.

* * * * *